May 30, 1967  D. GANS, JR., ETAL  3,322,141
CONTAINMENT VESSELS
Filed July 27, 1962  5 Sheets-Sheet 1

INVENTORS
DANIEL GANS, JR.
WALTER C. WOODMAN
ROBERT A. DE LUCA
NORMAN B. CLEVELAND
BY Morgan, Finnegan, Durham & Pine
ATTORNEYS

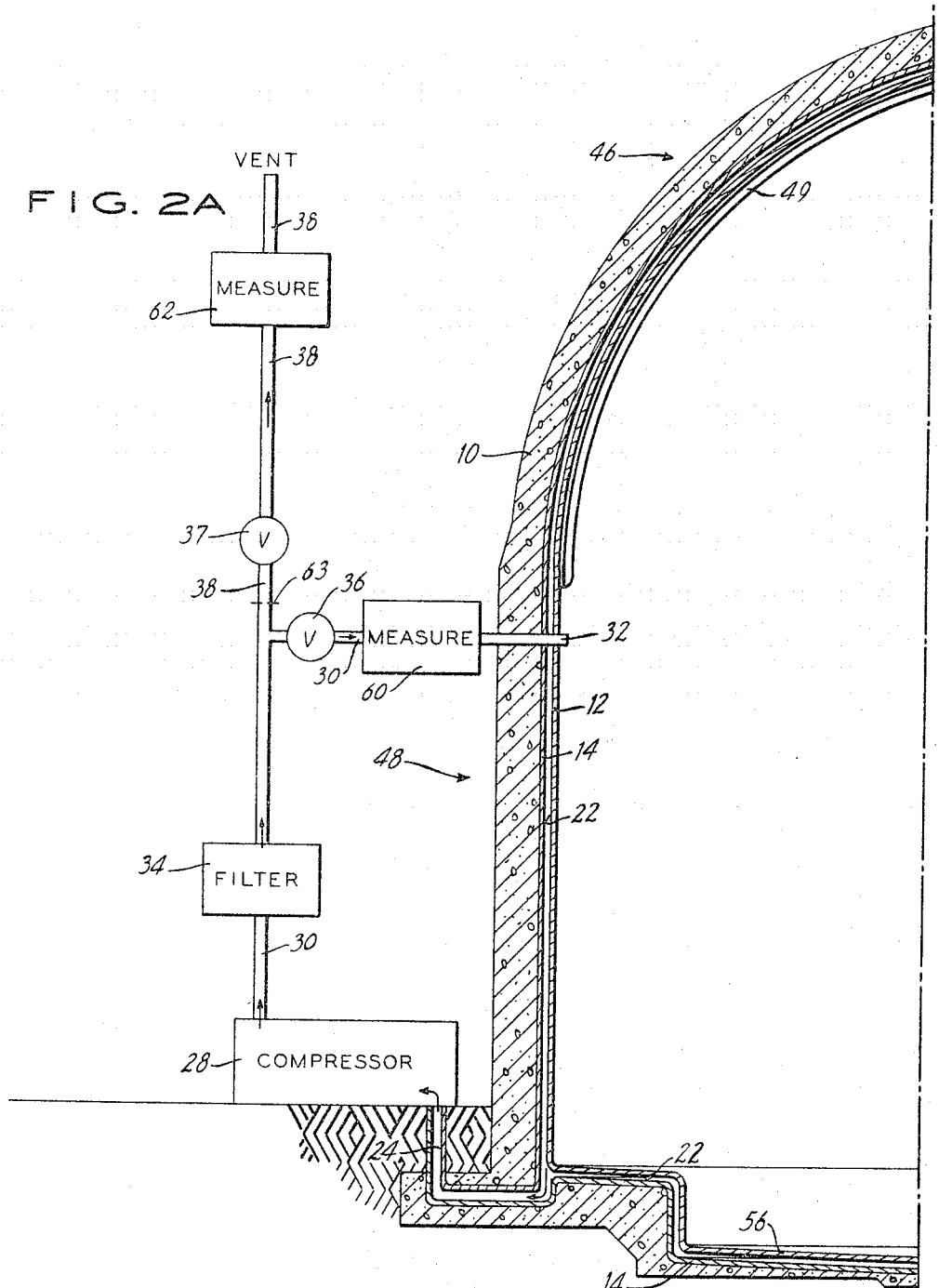

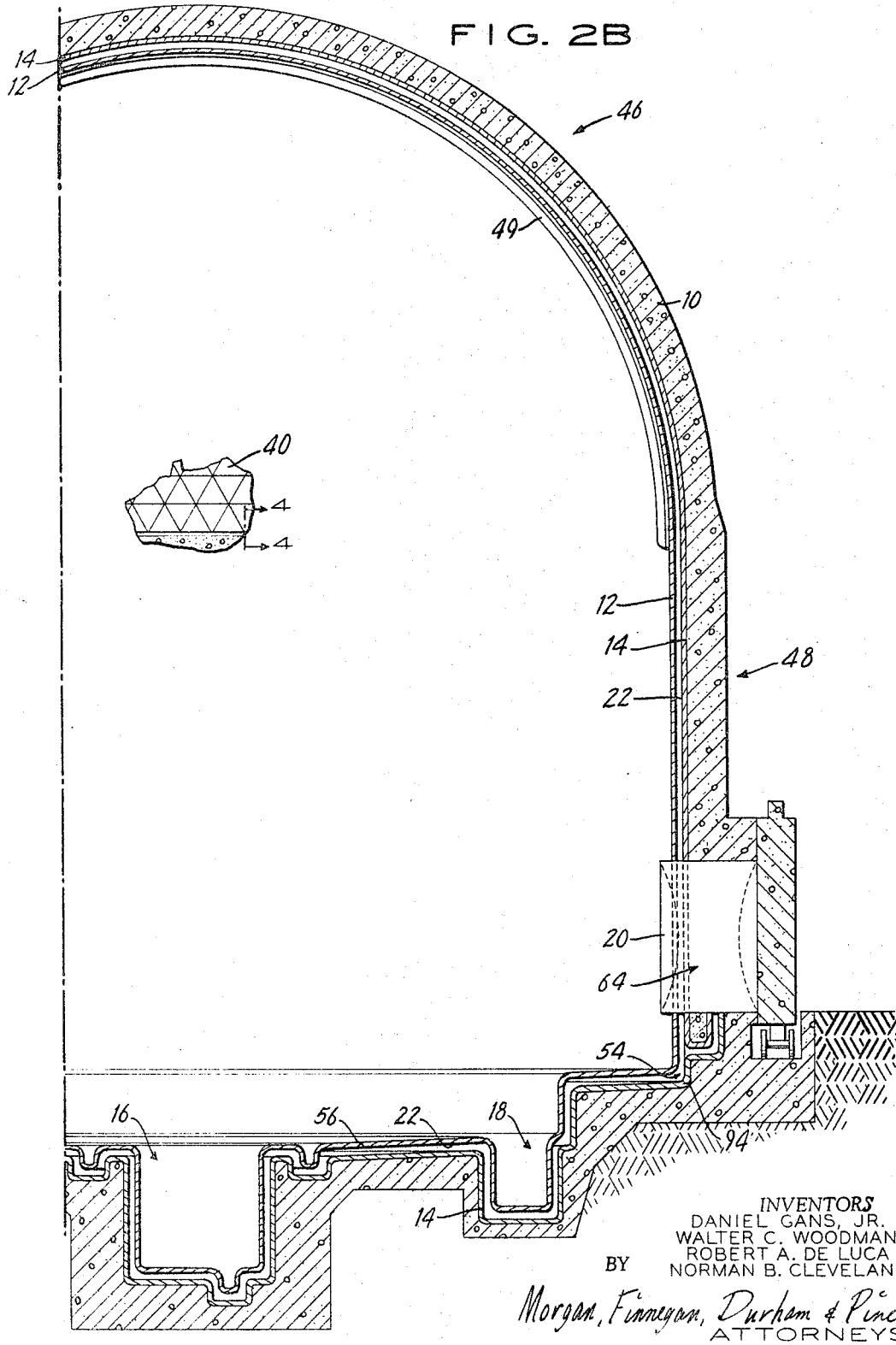

May 30, 1967  D. GANS, JR., ETAL  3,322,141
CONTAINMENT VESSELS
Filed July 27, 1962  5 Sheets-Sheet 4

INVENTORS
DANIEL GANS, JR.
WALTER C. WOODMAN
ROBERT A. DE LUCA
NORMAN B. CLEVELAND
BY
Morgan, Finnegan, Durham & Pine
ATTORNEYS

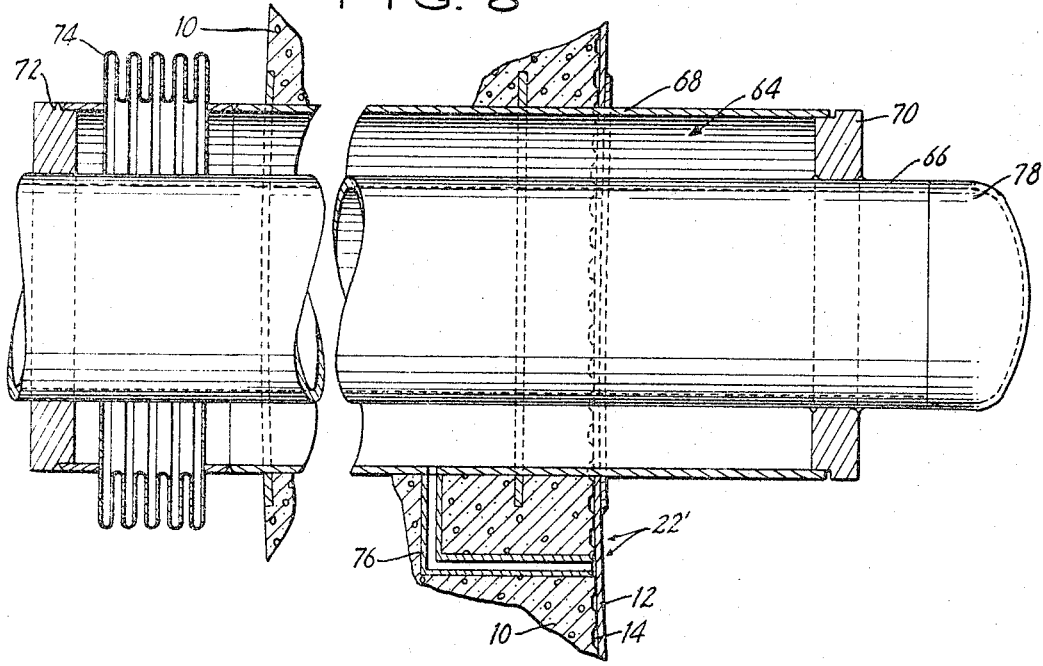
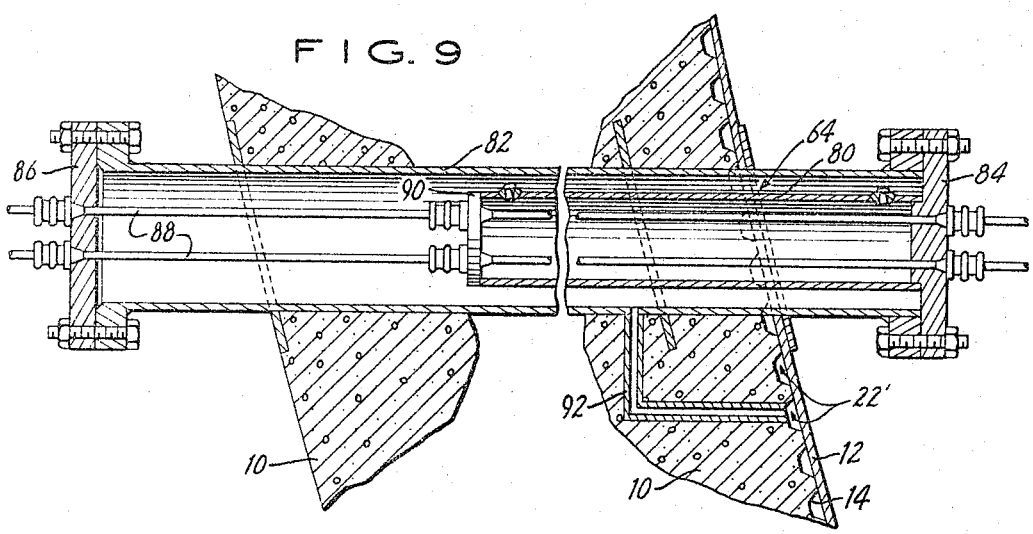

United States Patent Office 3,322,141
Patented May 30, 1967

3,322,141
CONTAINMENT VESSELS
Daniel Gans, Jr., Milton, Walter C. Woodman, Watertown, Robert A. De Luca, Newton Center, and Norman B. Cleveland, Swampscott, Mass., assignors to Stone & Webster Engineering Corporation, Boston, Mass., a corporation of Massachusetts
Filed July 27, 1962, Ser. No. 212,862
11 Claims. (Cl. 137—312)

This invention relates to containment vessels, and more particularly to improvements in containment vessels for nuclear power reactors, similar devices, or lethal environments from which leakage of toxic liquids, gases, or vapors may be a problem.

The first large scale commercial use of nuclear reactor plants promises to be in the field of electrical power generation. Since nuclear reactor power generating plants should be located in close proximity to heavily inhabited areas for economic reasons, it is essential for the general safety of the adjacent populace that such reactor plants be enclosed within a suitable containment vessel. The containment vessel surrounds the nuclear reactor and primary system and prevents the leakage of radioactive gases or vapors from within the enclosure to the surrounding atmosphere, both during normal operation and also in the event of certain types of nuclear incidents.

The release of even extremely small quantities of radioactive materials from containment vessels built with the best available degree of leaktightness may be prohibitive in certain localities, and particularly so in or near populous cities, such as are likely to have the requirements for and financial resources to construct nuclear power stations. The requirement of providing sufficient leaktightness to prevent the escape of even small amounts of radioactive materials has created a need for a new concept in containment vessels. The invention of this application provides this concept.

Accordingly, it is a primary object of this invention to provide a new and improved containment vessel that achieves both containment and control of all leakage from the containment vessel for nuclear reactors, similar devices, or lethal environments and prevents leakage of toxic gases or vapors to the surrounding environment.

It is also an object of this invention to provide a new and improved containment vessel for nuclear reactors and the like which yields a containment vessel and containment system that permits a nuclear reactor to be sited at any desired location, even in or near heavily populated areas, without fear of uncontrolled containment vessel leakage to the surrounding environment.

It is another object of this invention to provide a new and improved containment vessel for nuclear reactors and the like that includes means for continuously monitoring the integrity of the containment vessel to insure that its integrity is not accidentally compromised.

Another object of this invention is to provide a new and improved containment vessel for nuclear reactors and the like, and to achieve a new concept in containment vessel construction that is particularly applicable to containment vesesls of steel, or steel and concrete construction, which normally operate at a slight positive pressure, and that eliminates the problem of leakage from such positive pressure operation.

A further object of this invention is to provide a new and improved containment vessel for nuclear reactors and the like, which creates an enclosure that will retain liquid, gases, or vapor at elevated temperatures or pressure in the event of a nuclear incident or reactor accident, without leakage to the surrounding environment.

A still further object of this invention is to provide a new and improved containment vessel for nuclear reactors and the like, which is completely effective in preventing any leakage whatsoever from the containment vessel, but which is relatively simple, easy, and inexpensive to construct.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

In accordance with its purpose and objects, this invention provides means for achieving an essentially leakproof containment vessel for nuclear reactors and the like and is characterized by containment and control of all leakage from the interior compartment of the containment vessel. As embodied and broadly described, this means comprises an outer shell, a thin continuous liner within the outer shell, and a formed sheet between the inner surface of the outer shell and the outer surface of the liner which forms an annular space between the liner and the formed sheet. The invention also includes an evacuating and compressing means, a conduit for conducting gases and vapors from the annular space to the evacuating and compressing means and a second conduit for conducting the compressed gases and vapors back to the interior of the liner, so that any gas or vapor leakage from the interior of the liner to the annular space is returned to the interior of the liner.

The invention consists in the novel parts, constructions, arrangements, combinations and improvements shown and described.

The accompanying drawings which are incorporated in and constitute a part of this specification, illustrate one embodiment of the invention and together with the description, serve to explain the principles of the invention.

Of the drawings:

FIGS. 2A and 2B are a central vertical section of the containment vessel taken along the line 2—2 of FIG. 1 looking in the direction of the arrows;

FIG. 8 is a sectional view of a typical pipe penetration of the containment vessel; and FIG. 9 is a sectional view of a typical electrical penetration of the containment vessel.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a containment vessel is provided which is characterized by the containment and control of all leakage gases and vapors from the interior of the containment vessel. As embodied, the means for achieving the containment vessel provides, as shown in FIGS. 1, 2A and 2B, an outer shell 10, preferably of reinforced concrete, a continuous inner liner 12, preferably of steel sheet, and a formed sheet 14, preferably also of steel, between the outer shell 10 and the inner liner 12.

Figure 1:
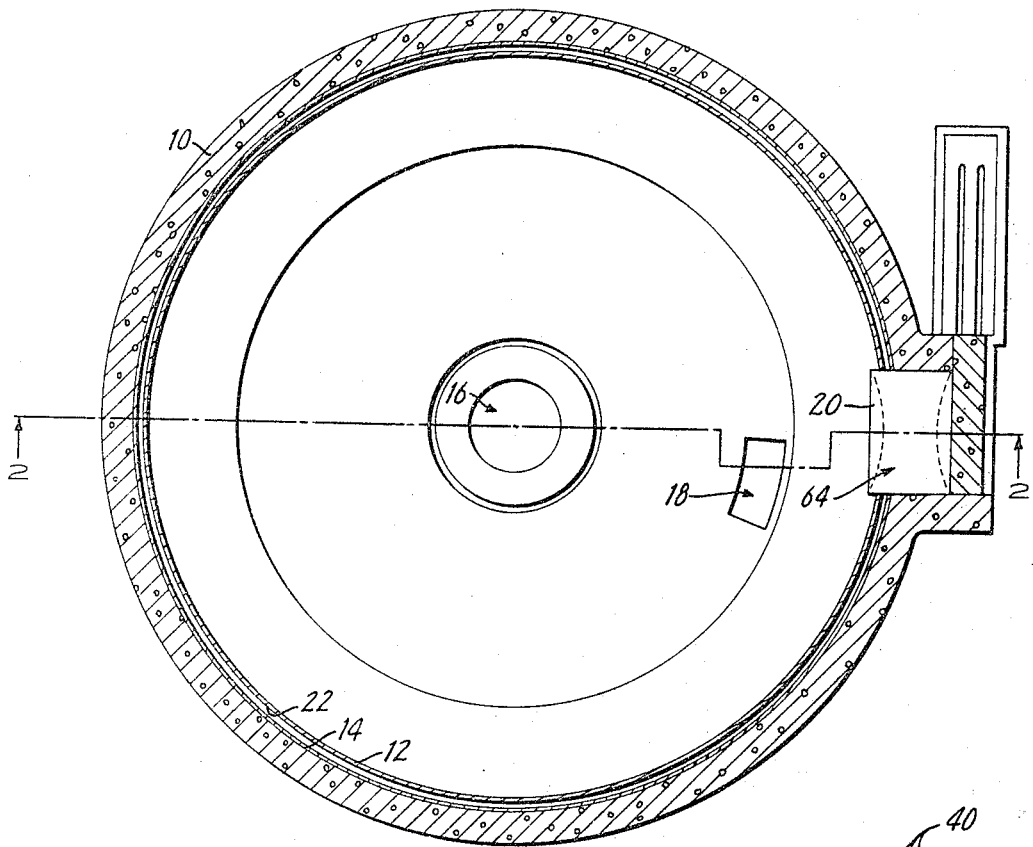
FIG. 1 is a sectional plan view of one embodiment of the containment vessel comprising this invention.

As shown in FIGS. 1 and 2B, a well 16 is provided for the nuclear reactor proper and a sump 18 is also included within the containment vessel. The containment vessel has an equipment hatch 20 by which the interior of the vessel can be reacted.

As embodied, the inner liner 12 comprises a continuous steel sheet with full penetration welds to provide a complete, or essentially complete, liner for the containment vessel. This steel liner 12 provides the maximum degree of commercially available leaktightness under the design temperature and pressure conditions of the containment vessel.

The formed sheet 14, as shown in FIGS. 1, 2A and 2B, and as embodied, may comprise fluted, ribbed, or dimpled or other shaped steel sheets. Formed sheet 14 is intermittently attached to the inner liner 12 by suitable means, such as anchoring or welding. The fluted, ribbed, dimpled, or other formed sheets 14, together with the inner liner 12, provide an annular space or compartment 22 between the inner liner and the outer shell (see FIGS. 3, 4 and 5). This annular space or compartment 22 thus effectively surrounds the entire inner liner 12.

Figure 3:
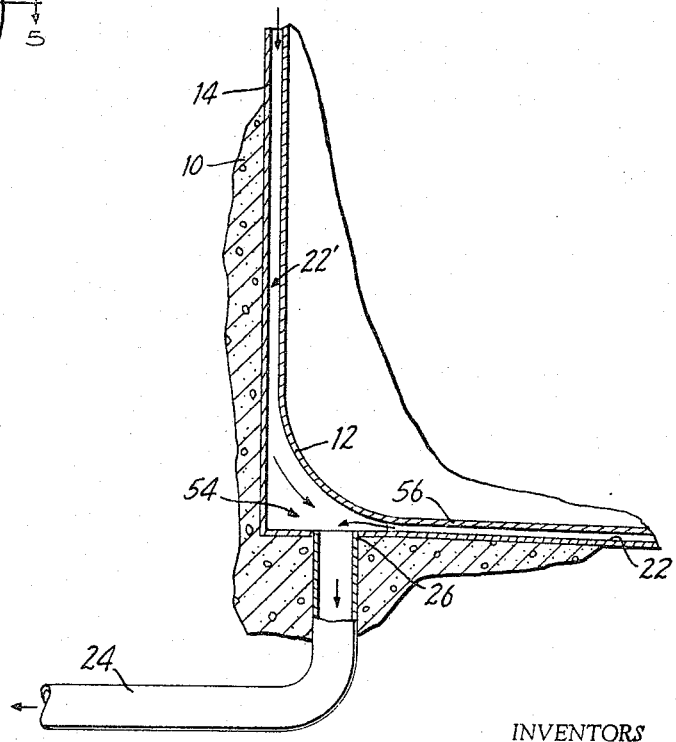
FIG. 3 is an enlarged detail sectional view showing the location of the conduit for withdrawing leakage gas from the annular space.

In containment vessels having a reinforced concrete outer shell 10, as shown in the present embodiment (FIGS. 1, 2A, and 2B), the formed sheets are joined in an essentially leaktight manner to minimize air in-leakage through the concrete into the annular space or compartment 22. In accordance with the invention, means are provided for evacuating leakage gases and vapors from the annular space and returning it to the interior of the inner liner. As embodied, this means comprises an evacuation conduit 24 (FIG. 3) which is connected to the annular space at 26, as shown in FIG. 3. This conduit 24 leads to a compressor 28 which serves to evacuate air, gas, or vapor from the annular space or compartment 22 (FIG. 1). A return conduit 30 (FIG. 2A) is provided from the compressor to return the gas withdrawn from the annular space to the interior of the inner liner 12 through a penetration of the containment vessel at 32. Any outside air in-leakage through the concrete into the annular space will also be collected by the compressor and returned to the interior of the inner liner 12.

The containment vessel system is designed so that a pressure slightly below atmospheric is maintained in the annular space 22 by the compressor 28 (FIG. 2A). In accordance with this invention, it may be desirable to include a filter 34 in the return conduit 30 for removing a portion of the gases, vapors and particulate material prior to returning the air and the balance of the gases and vapors to the interior of the inner liner of the containment vessel. Also, under carefully controlled conditions, it may be desirable to discharge the evacuated and filtered gases to the atmosphere by means, such as valves 36 and 37 and vent conduit 38 (FIG. 1). The filter 34 may be loaded with activated charcoal or a suitable molecular sieve.

Figure 6:
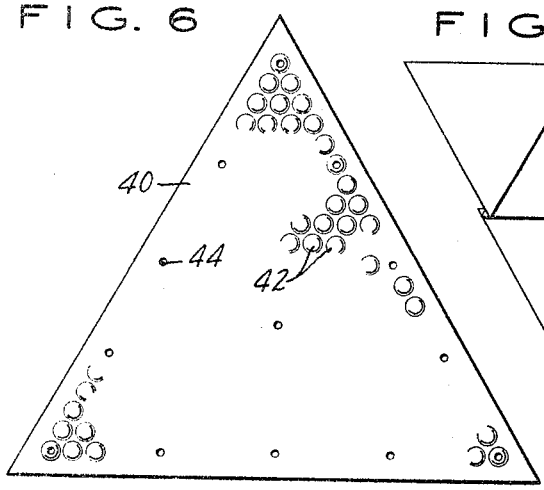
FIG. 6 is a detail view of a dome module portion of the formed sheet.
Figure 7:
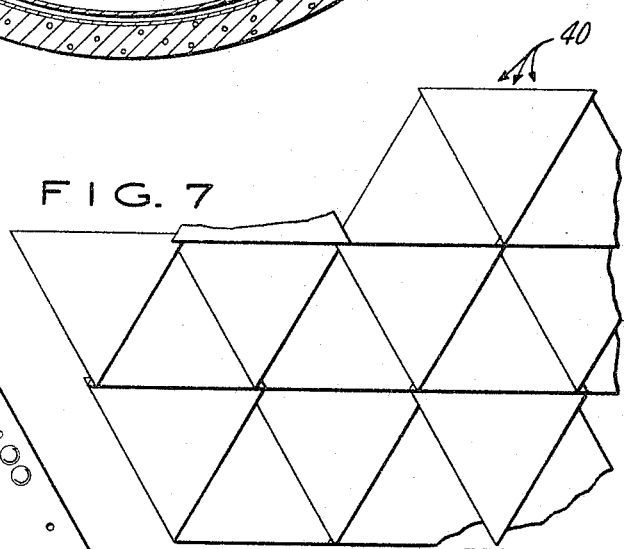
FIG. 7 is a view showing the arrangement of the dome modules illustrated in FIG. 6.

As shown in the preferred embodiment of the containment vessel illustrated in the drawings, the annular space or compartment 22 between the formed sheet 14 and the inner liner 12, is created in the dome portion of the containment vessel by means of a series of dome modules 40, as illustrated in FIGS. 2B, 4, 6, and 7. Each dome module 40 includes a large multiplicity of dimples or indentations 42, and at selected intervals these dimples 42 are attached or welded to the liner as shown for example, at 44 (FIG. 6). The dome 46 (FIGS. 2A and 2B) of the containment vessel comprises a domed reinforced concrete outer shell 10, a dome shaped inner liner 12, and a multiplicity of dome modules 40 intermittently welded or attached to the outer surface of the inner liner 12 with the dome modules 40 arranged substantially as shown in FIG. 7.

Figure 4:
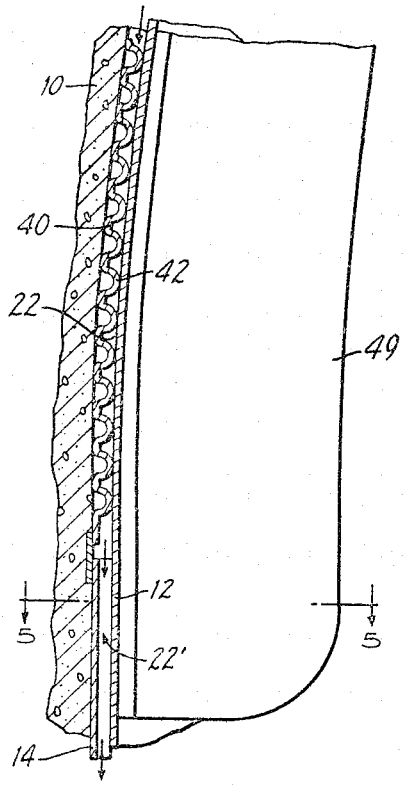
FIG. 4 is an enlarged detail sectional view showing the containment vessel outer shell, liner, and formed sheet in the area of the bend line or the area where the dome of the containment vessel joins the rest of the vessel.
Figure 5:
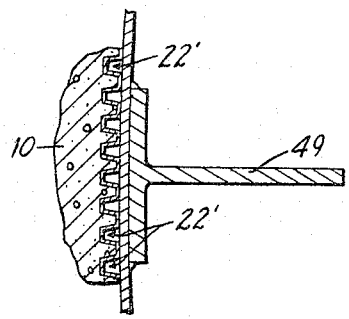
FIG. 5 is a sectional view taken along the line 5—5 of FIG. 4.

The annular space or compartment 22 that is created between the continuous formed sheet 14 made up from the dome modules 40 and the inner liner 12 is illustrated in FIG. 4 which shows a detailed cross section that is taken at the bend line of the dome. Also shown in FIGS. 2A, 2B, 4 and 5 is a curved T-beam 49 which aids in supporting the dome of the containment vessel.

The continuous annular space 22 formed between the dome modules 40 and the liner 12 is a continuation of this same annular space 22 which circumferentially surrounds the lower portion 48 of the containment vessel. This annular space in the lower portion 48 of the containment vessel is formed, in this preferred embodiment, from ribform steel sheets 14 that are intermittently welded or otherwise suitably attached to the liner 12 (FIGS. 1, 2A, 2B, 3, and 5). The ribform steel sheets 14, as shown by the detail cross-section in FIG. 5, form a series of adjacent vertical channels 22' comprising the complete inner circumference of the entire lower portion 48 of the containment vessel. Each of these vertical channels 22', forming part of the main annular space 22, extends to the bottom of the outside circumference of the containment vessel, as most clearly shown in FIG. 3. Also as shown in FIG. 3, there is a continuous annular space 54 around the bottom of the outer circumference of the containment vessel which forms an annular chamber that is common to all of the vertical channels 22'. This annular chamber or space 54 is contained between the formed sheet 14 as represented by the ribform 14 in FIG. 3, and the liner 12, and is created by the curvature of the liner 12 away from the right angle corner made by the formed sheet 14.

A formed sheet of ribform 14 is also located under the portion of the liner 12 that forms the horizontal or floor portion 56 of the containment vessel, as shown in FIG. 3, and also along the substantially vertical sides of the sump 18, the well 16, and other vertical portions or substantially vertical portions of the floor. The channels created by this additional sheet of ribform sheet 14 are also connected by annular chambers at each corner similar to the annular chamber 54 as shown in FIG. 3. There is thus formed a continuous annular space or compartment 22 between the formed sheet 14 and the liner 12 around virtually the entire outer surface of the liner 12.

In accordance with the invention, additional means for withdrawing air, gas, or vapor from within the annular space 22 may be provided at various locations around the circumference of the lower portion 48 of the containment vessel, similar to the conduit 24 shown in FIG. 3.

Also, in accordance with the invention, measuring means may be included both in the return line or conduit 30 and in the vent conduit 38. The measuring means for the return line or conduit 30 is shown by a block diagram 60, and the measuring means for the vent conduit 38 is shown by a block diagram 62, as shown in FIG. 2A.

In accordance with the invention, during pre-operational testing, or at any time thereafter during operation, the annular space 22 between the liner 12 and formed sheet 14 of the containment vessel can be used as a temporary reservoir for leak detecting gases such as helium or Freon, so that all detectable leaks through the inner liner 12 can be located and repaired prior to initial or subsequent start-ups of the reactor.

Further, in accordance with the invention, means are provided for preventing any leakage of gas or vapor from the containment vessel in the vicinity of pipe, electrical, or other penetrations and equipment hatches. As embodied, this means comprises the creation of a secondary annular space 64 (FIGS. 8 and 9) around all the electrical and pipe penetrations and in equipment hatches (FIGS. 1 and 2A.)

FIG. 8 shows a typical pipe penetration, as for a main steam line. The main steam line 66 is surrounded by a pipe 68 of larger diameter so that a secondary annular space 64 is created between the steam line 66 and its surrounding pipe 68, as shown in FIG. 8. The pipe 68 is sealed at each end by sealing caps 70 and 72 (FIG. 8). The pipe 68 also includes a flexible expansion joint 74 which is located outside the main wall of the containment vessel. In accordance with the invention, a leakoff conduit 76 interconnects the secondary annular space 64 surrounding the main steam line 66 with the main annular space 22, as shown in FIG. 8. The main steam line 66 may be initially provided at its inner end with a removable cap 78 which is used during testing of the integrity of the containment vessel.

A secondary annular space 64 is created for the electrical penetrations by surrounding a relatively small diameter interior pipe 80 with a larger diameter exterior pipe 82, the secondary annular space 64 being formed between the two pipes, as shown in FIG. 9. The larger diameter pipe 82 extends completely through the wall of the containment vessel (FIG. 9) and is sealed at each end by sealing caps 84 and 86. The electrical lines 88 penetrate the outer sealing cap 86, run through only the larger diameter pipe 82 for some distance, as shown in FIG. 9, then penetrate cap 90 on the outside end of the interior pipe 80, and from there run through the interior pipe and finally penetrate the inner sealing cap 84, which is common to both pipes, and inside the containment vessel. The entire arrangement is clearly depicted by FIG. 9. In accordance with the invention, a leakoff conduit 92 interconnects the secondary annular space 64, which is surrounded by the exterior pipe 82, with the main annular 22' as shown in FIG. 9.

FIGS. 1 and 2B show an annular space 64 which is provided within the equipment hatch 20. As shown in FIG. 2B, the secondary annular space 64 within the equipment hatch 20 is connected to the main annular space 22 by the leakoff conduit 94.

After the containment vessel has been closed up, and sealed prior to normal power operation, the vessel may be pressurized with air to slightly above atmospheric pressure and maintained at that pressure under pressure control by any conventional, suitable instrumentation system. In accordance with this invention, when the containment vessel is in operation, any air leaking from the vessel, together with any outside air leaking into the annular space 22 is continuously withdrawn through the evacuating conduit 24 from the containment vessel, compressed by the compressor 28, measured by the measuring means 60 and returned by the return conduit 30 to the containment vessel. By operating in this manner, the disclosed invention provides means for preventing the discharge of any detectable quantities of leakage gases or vapors directly into the atmosphere.

Further, in accordance with this invention, it will be appreciated that any leakage of gas or vapors from the vicinity of pipe and electrical penetrations or equipment hatches into the secondary annular space 64 (FIGS. 2B, 8, and 9) will be drawn from the secondary annular space 64 into the primary annular space 22 by the negative pressure maintained within the annular space 22 by the compressor 28. A complete double sealing of the containment vessel is thus provided not only completely around the main inner liner 12 but also surrounding all pipe and electrical penetrations and equipment hatches or the like. The various leakoff conduits (94 in FIG. 2B, 76 in FIG. 8, and 92 in FIG. 9) connect each secondary annular space 64 with the main annular space 22, and thus make possible the evacuation of any leakage gas or vapor from the secondary annular spaces 64 via the main annular space 22.

Further, in accordance with this invention, excess air, over and above that required to maintain the minimum containment vessel pressure, may be continually filtered through filter 34 and continually or periodically vented under pressure control (valve 37) through a suitable flow restriction or orifice 63 in vent conduit 38, measured by measuring means 62 and then released to the atmosphere. Over a period of time, the difference between the two integrated air flow measurements made by measuring means 60 and measuring means 62 is a continuous measure of the integrity of the inner liner 12 of the containment vessel.

In accordance with this invention, if a nuclear incident should occur which releases quantities of radioactive gases and vapors inside the containment vessel, means may be provided for automatically closing the containment vessel vent with manual backup to ensure vent closure. Such automatic closure means can be provided by suitable and conventional instrumentation and devices.

The remainder of the containment vessel system continues in operation after closure of the vent and returns any leakage through the inner liner 12 into the annular space 22 back to the interior of the containment vessel. This operation may continue for a relatively long period of time until the design pressure of the containment vessel is approached. At this point, the compressor 28 will be stopped, or may be continued in conjunction with controlled manual venting of the containment vessel through the system described above. Dependent upon the containment vessel design factors, gaseous leakage can be recovered and stored within the containment vessel for a period of time ranging from several days to indefinitely.

This invention thus provides a new and useful result in containment vessels characterized by containment and control of all leakage from the interior of the containment vessel. The invention achieves this result by relatively simple, effective and inexpensive means through creation of an annular space or reservoir which traps all leakage from the interior of the containment vessel, and through the system provided, can return it to the interior of the containment vessel so that no detectable quantities of leakage are discharged directly to the atmosphere.

The invention in its broader aspects is not limited to the specific mechanisms shown and described, but also includes within the scope of the accompanying claims any departures made from such mechanisms which do not depart from the principles of the invention and which do not sacrifice its chief advantages.

What is claimed is:

1. In a containment vessel system, the new and useful result characterized by containment and control of all leakage from the interior of the containment vessel and physically attained by: a containment vessel comprising an outer, relatively thick, pressure-containment shell, a relatively thin, continuous, inner liner disposed within the space enclosed by the outer shell and providing an interior compartment for the vessel, and a continuous formed sheet located between the liner and the shell and surrounding the liner, for transferring high pressures exerted upon the liner from said compartment, to said shell, said continuous formed sheet being attached intermittently to said liner and running back and forth between the inner surface of the outer shell and the outer surface of the inner liner, said sheet forming with the liner an annular space around said compartment between the liner and the formed sheet; means for evacuating and compressing gases and vapors from the annular space; a first conduit means for conducting gases and vapors from the annular space to the evacuating and compressing means; and a second conduit means for conducting the compressed gases and vapors to said interior compartment of the vessel, whereby any gas or vapor leakage from the interior compartment of the vessel to the annular space is returned to the interior compartment of the vessel.

2. The invention as defined in claim 1, in which the containment vessel system also includes measuring means for measuring the compressed gases and vapors before their return to the interior compartment of the vessel.

3. The invention as defined in claim 1, in which the containment vessel system also includes a filter associated with said second conduit means for filtering the compressed gases and vapors prior to their return to the interior compartment of the vessel.

4. The invention as defined in claim 1, in which the containment vessel system also includes a vent conduit and valve means therefor, both associated with said second conduit means, whereby a desired proportion of the compressed gases and vapors may be vented to the atmosphere in a controlled manner.

5. The invention as defined in claim 4, in which said second conduit means also includes filter means for filtering the compressed gases and vapors before their return to the interior compartment of the vessel.

6. The invention as defined in claim 5, in which the containment vessel system also includes measuring means for measuring compressed gases and vapors before their return to the interior compartment of the vessel, and the vent conduit also includes measuring means for measuring compressed gases and vapors prior to their release to the atmosphere through the vent conduit.

7. The invention as defined in claim 1 and in which the containment vessel system also includes a pipe penetration structure, the pipe penetration structure comprising an inner pipe for introducing or removing steam or the like, an outer pipe surrounding the inner pipe and providing a secondary annular space between the outer surface of the inner pipe and the inner surface of the outer pipe, the outer pipe being sealed around the inner pipe and extending through the outer shell and inner liner of the containment vessel, and a leakoff conduit connecting the secondary annular space to the annular space formed between the inner liner and the formed sheet.

8. The invention as defined in claim 1 and in which the containment vessel system also includes an electrical penetration structure, the electrical penetration structure comprising an inner enclosure for electrical lines, extending from the interior compartment of the containment vessel into the outer shell of the containment vessel, an outer enclosure for said lines circumferentially surrounding the inner enclosure, extending from the interior compartment completely through both the inner liner and outer shell to the exterior of the containment vessel, and being sealed around the inner enclosure, thereby providing a secondary closed annular space between the outer surface of the inner enclosure and the inner surface of the outer enclosure, and a leakoff conduit connecting the secondary closed annular space to the annular space formed between the inner liner and the formed sheet.

9. A containment vessel comprising a relatively thick, continuous outer concrete shell, said shell having a generally horizontally-extending floor portion, a generally vertically-extending side-wall portion and a curved dome portion capping said side-wall portion; a relatively thin continuous steel liner for said shell, said liner being disposed within the space enclosed by said shell and in spaced relation to said shell and providing a main interior compartment with a high degree of leak-tightness, said liner also having a configuration generally complementary to the configuration of the interior surface of said shell; and a formed, continuous relatively thin steel sheet located between the inner surface of said shell and the outer surface of said liner, said formed sheet forming with the liner an annular space completely surrounding said main interior compartment, said formed sheet, over the area of said side-wall and floor portions, comprising a series of ribform steel sheets assembled and joined to each other in an essentially leak-tight manner, and said formed sheet, over the area of said dome portion, comprising a series of dome modules assembled and joined to each other in an essentially leak-tight manner; outlet conduit means leading from said annular space through said shell to the exterior of said shell for evacuating fluid from said annular space; and inlet conduit means leading from the exterior of said shell through said shell and said annular space to said main interior compartment for returning fluid evacuated from said annular space to said compartment.

10. A containment vessel in accordance with claim 9 in which said rib-form sheets, as assembled, divide said annular space into a series of adjacent channels and are secured to said liner between adjacent channels, said channels running vertically along said side-wall portion and generally horizontally along said floor portion and terminating at the bottom of the vertical channels in a common chamber portion of said annular space, and in which said dome modules have indentations and are secured at the bottom of said indentations to said liner and divide said annular space along said dome portion into dome channels communicating with the tops of said vertical side-wall channels.

11. A containment vessel in accordance with claim 10 in which said dome modules are each of triangular configuration and as assembled, are in overlapping relation.

References Cited

UNITED STATES PATENTS

| | | | |
|---|---|---|---|
| 1,381,175 | 6/1921 | Ericsson | 220—63 |
| 1,987,147 | 1/1935 | Gross | 52—380 |
| 2,641,449 | 6/1953 | Antony | 165—49 |
| 3,110,157 | 11/1963 | Radd | 220—14 X |

FOREIGN PATENTS

| | | |
|---|---|---|
| 1,109,278 | 6/1961 | Germany. |

OTHER REFERENCES

Nuclear Merchant Ship Reactor Final Safeguards Report Environmental Analysis of NS "Savannah" Operation at Camden, USAEC Report ORNL, 2867 (Rev.), Oak Ridge National Laboratory, Jan. 24, 1961, pages 9–11.

Fontana, M.H.: Containment by Conventional Building Structures in Nuclear Safety, 1 (4); pages 53–56, June 1960.

WILLIAM F. O'DEA, *Primary Examiner.*

EMILE PAUL, ISADOR WEIL, *Examiners.*

R. GERARD, *Assistant Examiner.*